(12) United States Patent
Demsey et al.

(10) Patent No.: US 7,681,204 B2
(45) Date of Patent: Mar. 16, 2010

(54) EVENT FILTERING AT A PERFORMANCE-BASED INTERFACE

(75) Inventors: Seth M. Demsey, Seattle, WA (US); Christopher W. Lorton, Bothell, WA (US); Jamie A. de Guerre, San Francisco, CA (US); David C. Wrighton, Redmond, WA (US); Katrina Schaeffer, Seattle, WA (US); Michael G. Boilen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1689 days.

(21) Appl. No.: 10/790,522

(22) Filed: Mar. 1, 2004

(65) Prior Publication Data

US 2005/0193391 A1 Sep. 1, 2005

(51) Int. Cl.
*G06F 9/44* (2006.01)
(52) U.S. Cl. ...................... 719/318; 719/313
(58) Field of Classification Search ............. 719/318, 719/310, 328, 313
See application file for complete search history.

(56) References Cited

U.S. PATENT DOCUMENTS

| | | | | |
|---|---|---|---|---|
| 5,757,925 A * | 5/1998 | Faybishenko | ............... | 709/203 |
| 5,822,758 A * | 10/1998 | Loper et al. | .................. | 711/130 |
| 5,867,494 A * | 2/1999 | Krishnaswamy et al. | .... | 370/352 |
| 5,867,495 A * | 2/1999 | Elliott et al. | ................. | 370/352 |
| 5,999,525 A * | 12/1999 | Krishnaswamy et al. | .... | 370/352 |
| 6,041,365 A * | 3/2000 | Kleinerman | ................ | 719/328 |
| 6,275,957 B1 * | 8/2001 | Novik et al. | ................. | 714/39 |
| 6,314,533 B1 * | 11/2001 | Novik et al. | .................. | 714/39 |
| 6,335,927 B1 * | 1/2002 | Elliott et al. | ................. | 370/352 |
| 6,367,034 B1 * | 4/2002 | Novik et al. | .................. | 714/39 |
| 6,487,208 B1 * | 11/2002 | Chirashnya et al. | ......... | 370/400 |
| 6,502,102 B1 * | 12/2002 | Haswell et al. | ............. | 707/102 |
| 6,523,027 B1 * | 2/2003 | Underwood | ................... | 707/4 |
| 6,560,720 B1 * | 5/2003 | Chirashnya et al. | ........... | 714/32 |
| 6,601,195 B1 * | 7/2003 | Chirashnya et al. | ........... | 714/43 |
| 6,601,233 B1 * | 7/2003 | Underwood | ................ | 717/102 |
| 6,609,128 B1 * | 8/2003 | Underwood | ................. | 707/10 |
| 6,633,878 B1 * | 10/2003 | Underwood | ................ | 707/100 |
| 6,647,432 B1 * | 11/2003 | Ahmed et al. | ............... | 719/318 |
| 6,671,829 B2 * | 12/2003 | Kaler et al. | .................... | 714/39 |
| 6,701,514 B1 * | 3/2004 | Haswell et al. | ............. | 717/115 |

(Continued)

OTHER PUBLICATIONS

Howard Chen, et al., Dynamic Trace Selection Using Performance Monitoring Hardware Sampling, Proceedings of the international symposium on Code generation and optimization: feedback-directed and runtime optimization, 2003, pp. 79-90, San Francisco, California, USA.

(Continued)

*Primary Examiner*—Van H Nguyen
(74) *Attorney, Agent, or Firm*—Workman Nydegger

(57) ABSTRACT

Architecture that facilitates performance enhancement in message-based computing across a performance-based interface. When a request from a source is transmitted across the interface to a destination, a filter component in communication with the destination dynamically allows only one or more relevant responses from the destination to transition the interface to the source. This mechanism achieves an even tighter filtering of events while at the same time giving developers more flexibility over the events they choose to register, thereby enhancing the performance of message-based computing architectures by reducing unnecessary computation.

27 Claims, 6 Drawing Sheets

U.S. PATENT DOCUMENTS

| | | | |
|---|---|---|---|
| 6,704,873 B1* | 3/2004 | Underwood | 726/12 |
| 6,718,535 B1* | 4/2004 | Underwood | 717/101 |
| 6,724,875 B1* | 4/2004 | Adams et al. | 379/201.01 |
| 6,731,625 B1* | 5/2004 | Eastep et al. | 370/352 |
| 6,748,455 B1* | 6/2004 | Hinson et al. | 719/318 |
| 6,754,181 B1* | 6/2004 | Elliott et al. | 370/252 |
| 6,870,546 B1* | 3/2005 | Arsenault et al. | 345/619 |
| 6,907,546 B1* | 6/2005 | Haswell et al. | 714/38 |
| 6,909,708 B1* | 6/2005 | Krishnaswamy et al. | 370/352 |
| 6,973,034 B1* | 12/2005 | Natarajan et al. | 370/232 |
| 7,100,195 B1* | 8/2006 | Underwood | 726/2 |
| 7,145,898 B1* | 12/2006 | Elliott | 370/352 |
| 7,219,329 B2* | 5/2007 | Meijer et al. | 717/106 |
| 2002/0064149 A1* | 5/2002 | Elliott et al. | 370/352 |
| 2004/0098731 A1* | 5/2004 | Demsey et al. | 719/328 |
| 2005/0050545 A1* | 3/2005 | Moakley | 718/104 |

OTHER PUBLICATIONS

Ehab Al-Shaer, et al., Adaptive Object-Oriented Filtering Framework for Event Management Applications, ACM Computing Surveys, 2000, vol. 32-Issue 1es.

Matthew Farrens, et al., Dynamic Base Register Caching: A Technique for Reducing Address Bus Width, Proceedings of the 18th annual international symposium on Computer architecture, 1991, pp. 128-137, Toronto, Ontario, Canada.

* cited by examiner

EVENT FILTERING AT A PERFORMANCE-BASED INTERFACE

TECHNICAL FIELD

This invention is related to software application platforms, and more specifically, interoperability between managed and native environments.

BACKGROUND OF THE INVENTION

Technological advances in semiconductor devices continue to spawn larger numbers of portable computing devices that can require small footprint execution environments and application platforms, many of which are resource constrained. In the marketplace, it is competitively critical to have a platform that is a preferment and is as flexible as possible. Interoperability across a native/managed boundary between the managed platform and the native operating system, which provides many of the base services on which the platform relies, has an overhead cost that is expensive to process in rapid succession.

In GUI (graphical user interface) applications, events need to be trafficked across the native/managed boundary. There are so many events that it becomes a potential performance roadblock. Conventional user interface (UI) systems use a static system that allows the framework to be preferment through filtering of the UI events that are returned to the application. This is important, since the transition from the native code layer to the managed code layer is expensive in terms of at least resources consumed and processor cycles. Thus, minimizing transitions across this boundary has a dramatic effect on application performance. One existing static filtering system forces a developer to make decisions on which events are propagated and which events will not. For those that are not propagated, managed code developers have no way to register or be called back on any of these events, thereby limiting the flexibility of developers on the platform.

What is needed is a flexible event filtering system that maintains high performance without sacrificing developer flexibility.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system that facilitates a performance enhancement in message-based computing across a performance-based interface. When a request from a source is transmitted across the interface to a destination, a filter component in communication with the destination dynamically allows only one or more relevant responses from the destination to transition the interface to the source. This mechanism achieves an even tighter filtering of events while at the same time giving developers more flexibility over the events they choose to register, thereby enhancing the performance of message-based computing architectures by reducing unnecessary computation.

In another aspect of the present invention, there is provided a system that facilitates a performance enhancement in message-based computing across a performance-based interface between a managed code framework and a native code framework. When the managed code framework generates a request to the native framework, the native code framework receives the request and issues one or more responses thereto. A filter component in communication with the native code framework dynamically allows only one or more relevant responses of the native code framework to transition the interface to the managed code framework. All irrelevant responses are discarded.

In another aspect of the present invention, there is provided a system that uses type introspection to allow a developer to dynamically register and un-register events. When the system initializes one or more of its managed objects, it determines if the user has derived their own custom object. If so, the system further determines if the user has modified the handling of messages in the custom object. When modified, the native code framework is notified that messages associated with the modified handling are of interest. The system then forwards only those messages to the managed code framework for the duration of the lifetime of the managed object.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
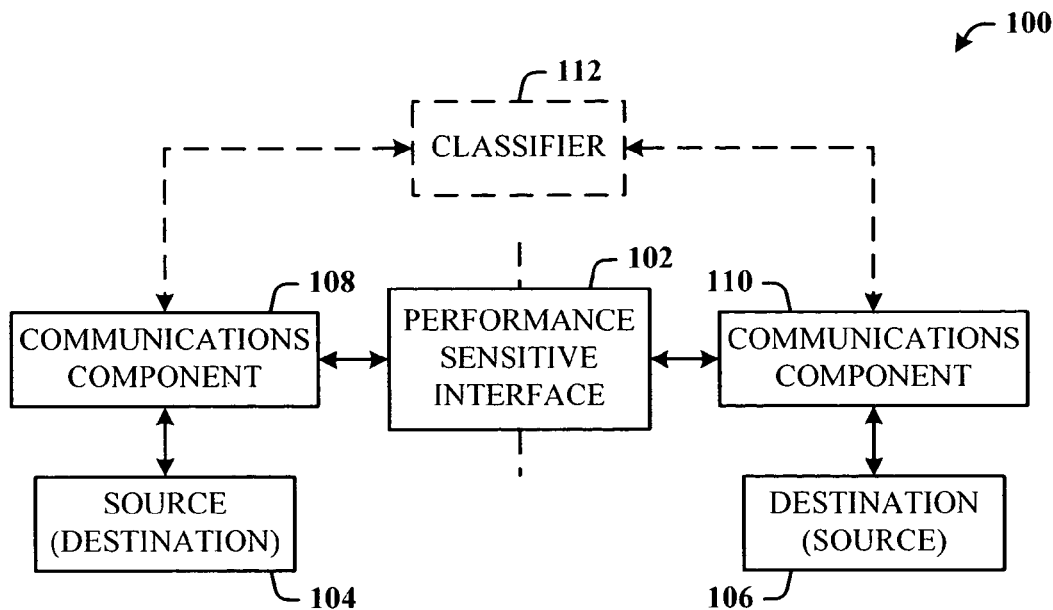
FIG. 1 illustrates a system that performs event filtering in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a system 100 that performs event filtering in accordance with the present invention. The system 100 includes a performance-based interface 102 that the transmission across degrades system performance in some way by requiring increased system resources to process data moving across the interface 102. In one implementation, which will be described in detail hereinbelow, the interface 102 is that which exists between managed and native code. In another implementation, the interface 102 is that which exists between a client and a server. Such an interface 102 exists in many other systems, for example, communications systems where a portable communications device sends a signal requesting a response, which response comprises more data than is requested such that the system processing is excessive for what it actually needs to be.

On either side of the interface 102, for purposes of this description, are a source component 104 (which can also be a destination) and a destination component 106 (which can also be a source with respect to the destination 104). The source component 104 communicates across the interface 102 to the destination 106 via a communications component 108, and the destination component 106 receives the communication from the source 106 via a communications component 110. Similarly, a request or signal sent from the destination 106, now being a source 106, can require system resources to process the transition of the signal across the interface 102 to the destination 104 (previously the source 104). The destination 104 can then attempt to transmit one or more responses back across the interface 102, the excess of which require excessive system resources.

In order to minimize the use of excessive system resources for signaling across the interface 102, the communications components (108 and 110) only forward requested and necessary information to the sources. That is, when the source 104 sends a request to the destination 106, the communications component 110 receives and processes the request, forwards the request to the destination 106, receives the responses from the destination 106, filters out all unnecessary responses, and forwards only the requested information across the interface 102 to the source 104. Similarly, where the destination 106 is now a requesting source 106, the source 106 transmits a request to the destination 104 (previously the source 104). The destination 104 responds with excessive amounts of information to the communications component 108. That is, when the source 106 sends a request to the destination 104, the communications component 108 receives and processes the request, forwards the request to the destination 104, receives the responses from the destination 104, filters out all unnecessary responses, and forwards only the requested information across the interface 102 to the source 106.

It is to be appreciated by one skilled in the art that the source 104 may comprise multiple source subcomponents communicating requests through the communications component 110 to multiple (or single) respective destinations, such that the communication component 110 processes and forwards each of the requests to the respective (or single) destinations, receives the responses back from each of the multiple respective (or single) destinations, and forwards only the necessary responses across the interface 102 to the corresponding source 104.

Additionally, the communications component 110 may comprise multiple subcomponents, each which handles a different type of request for the source 104 and associated responses from the destination 106 such that excessive responses for each of the requests are prevented from being transmitted across the interface 102 back to the source 104.

The system 100 can also employ various artificial intelligence based schemes for carrying out various aspects of the subject invention (although this is not a requirement, as indicated by the dashed lines). For example, a process for determining the number and type of responses to be returned to the source 104 can be facilitated via an automatic classifier system and process. Moreover, where the there are multiple communications subcomponents of the component 110, the classifier 112 can be employed to perform load balancing, for example, to determine which subcomponent to be used for processing the request and responses back to the source 104.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or make an inference that a user desires to be automatically performed. In the case of request/response systems, for example, attributes can be request or response, and the classes are categories or areas of interest (e.g., levels of priority).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) may be used to perform a number of functions, including but not limited to automatically determining according to a predetermined criteria what response(s) should be returned for a given request, when the response(s) should be returned based on the state of the interface 102, what request(s) should be process first, what responses should be processed, what responses should be processed before other responses, and what subcomponents of the communication component 110 should be employed (in a load balancing scenario, for example).

The classifier 112 can also be used to make determinations based upon the type of computing device in which the performance-based interface is being employed. For example, where the computing device includes a touch screen user interface, but the managed code interprets the request from an input mechanism other than the touch screen, that being an unsupported input mechanism, the classifier 112 can automatically provide substitute event handling. For example, is the managed code issues a request for a mouse, yet no mouse exists, the classifier 112 controls the system 100 to provide the substitute response(s) to the request.

In another implementation, the system 100 can include a global filter that adds or subtracts messages and response(s) to those messages. That is, even if the managed code requests one or more responses, the system 100 will "know" that for al purposes, the managed code does not want those responses. This can also be facilitated by the classifier 112.

Figure 2:
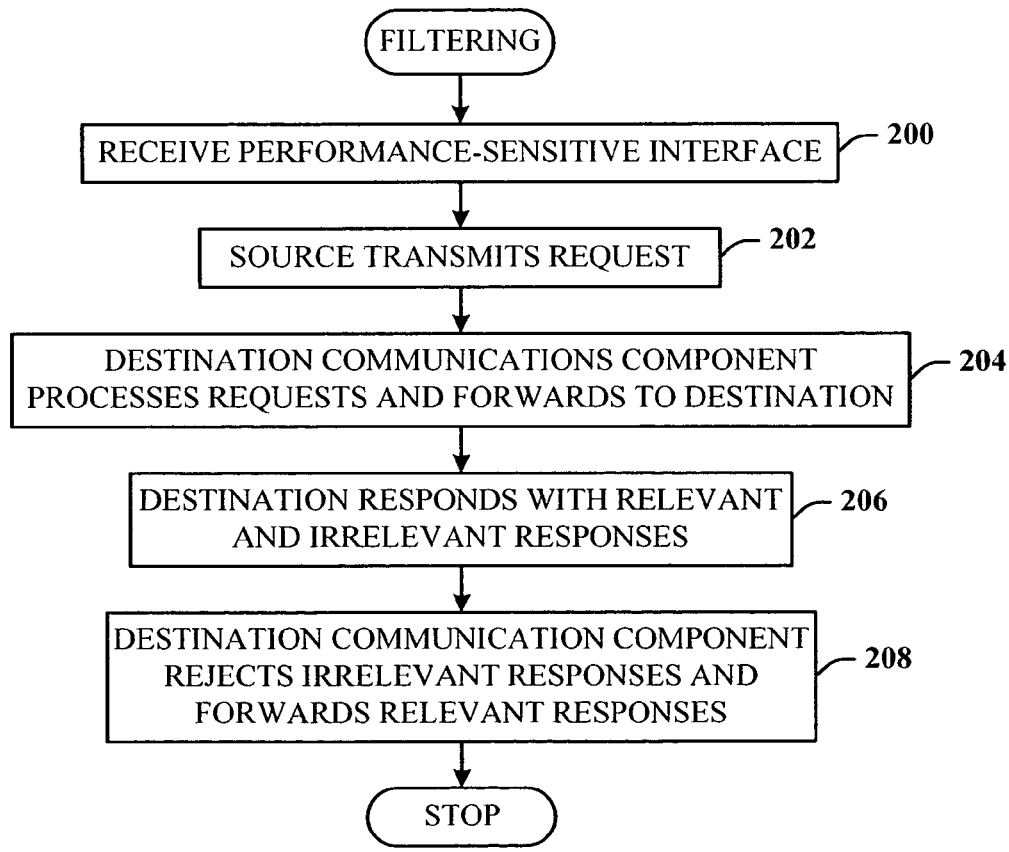
FIG. 2 illustrates a flow chart of process in accordance with the present invention.

Referring now to FIG. 2, there is illustrated a flow chart of process in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the performance-sensitive interface is received. At 202, a source transmits a request. At 204, a destination communications component receives, processes, and forwards the request to the destination. At 206, the destination processes the request and transmits response information back to the communications component. At 208, the destination communications component processes the response information to disallow irrelevant response information and allow only the relevant response information to transition across the interface to the source. The process then reaches a Stop block.

Figure 3:
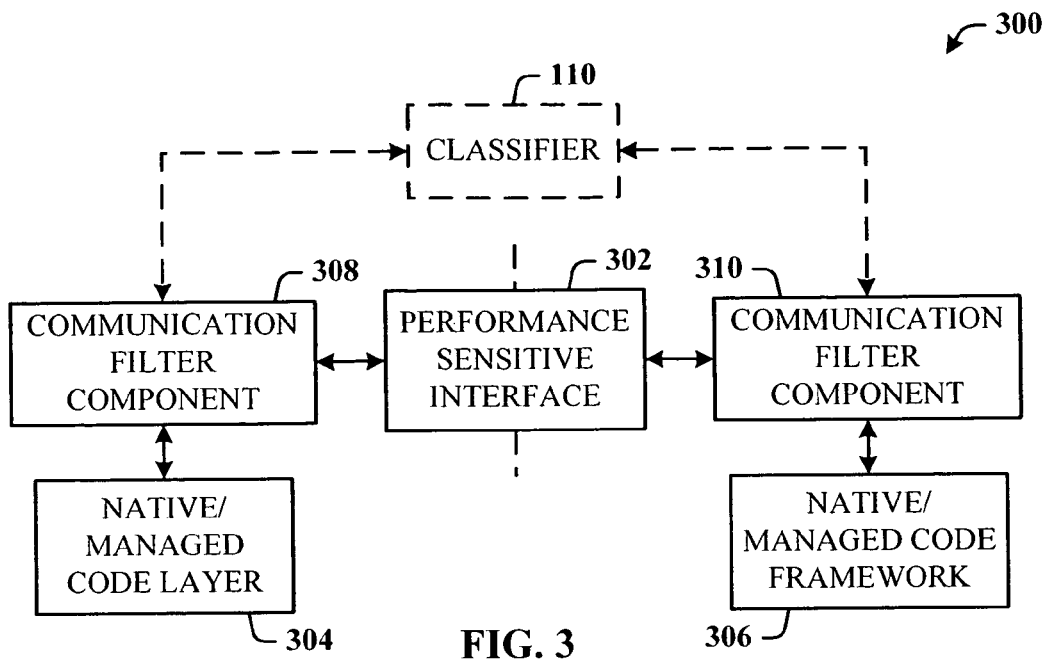
FIG. 3 illustrates a system that performs event filtering in accordance with the present invention.

Referring now to FIG. 3, there is illustrated a system 300 that performs event filtering in accordance with the present invention. The system 300 includes a performance-based interface 302 between a layer 304 that can comprise at least one of native code and managed code, and a framework 306 that can comprise at least one of native code and managed code. Thus, the performance-based interface 302 can exist cross-process in native code and/or potentially cross-machine over a network (for a non-GUI scenario).

Such a performance-based interface 302 can exist between the native code layer 304 and managed code framework 306 with respect to a graphical user interface (GUI). A GUI portion of a small footprint execution environment and application platform can consist of two main components: an interface layer written in native code (e.g., between a WINDOWS CE brand graphics/windowing/events system (GWES) and the framework provided to developers) and the framework itself, written in managed code. The transition between the native code layer 304 and the managed code framework 306 is relatively expensive in terms of performance, so the native interface layer only forwards a subset of all messages from the GWES to the managed framework. Traditionally, choosing the subset of messages involved a tradeoff between a minimum number of messages required to make the managed framework useful, and the overhead of forwarding messages of no interest to the user of the framework.

The system 300 includes a includes a communications filter component 308 (similar to communications components 108 and 110) that resides on the native code side of the interface 302 and simultaneously alleviates traditional limitations of selecting a subset of all possible responses of the native code 304 for exposure to the managed framework. Additionally, the communications filter component 308 also addresses performance issues that would arise from attempting to forward all GWES responses by allowing only relevant responses to cross the interface 302 to the managed code 306, thus conserving system resources an enhancing system performance.

The system 300 can also include a communications component 310 (although this is not required) as part of the managed framework that can be employed to handle callbacks from the native layer 304 to the managed code 306 to ensure that the request received was that which was sent, and was sent from that managed code 306. The communications component 310 receives and processes the callback from the native layer 304, and forwards the callback to the managed code 306. The managed code 306 responds with information that may contain more than what is needed by the native layer 304. The component 310 than filters out the excess information and forwards only the relevant or required information across the interface 302 to the native layer 304.

The system 300 can also include the classifier 110 to perform a number of functions mentioned previously.

It is to be appreciated that the present invention is not restricted to GUI classes, but can be employed in many types of non-GUI classes that process events. There is a list of classes in the most any application that want to know about the responses to the request. Any system that uses messages or callbacks can employ the novel architecture. For example, this can include memory systems, timers, network data, and network status information.

Other small footprint environments that typically run on reduced resources include small devices, e.g., PDAs, cell phones, set-top boxes for TVs, video game units, and automobiles. However, the disclosed invention will also work with larger system computing devices, for example, desktop computer and portable computers.

Figure 4:
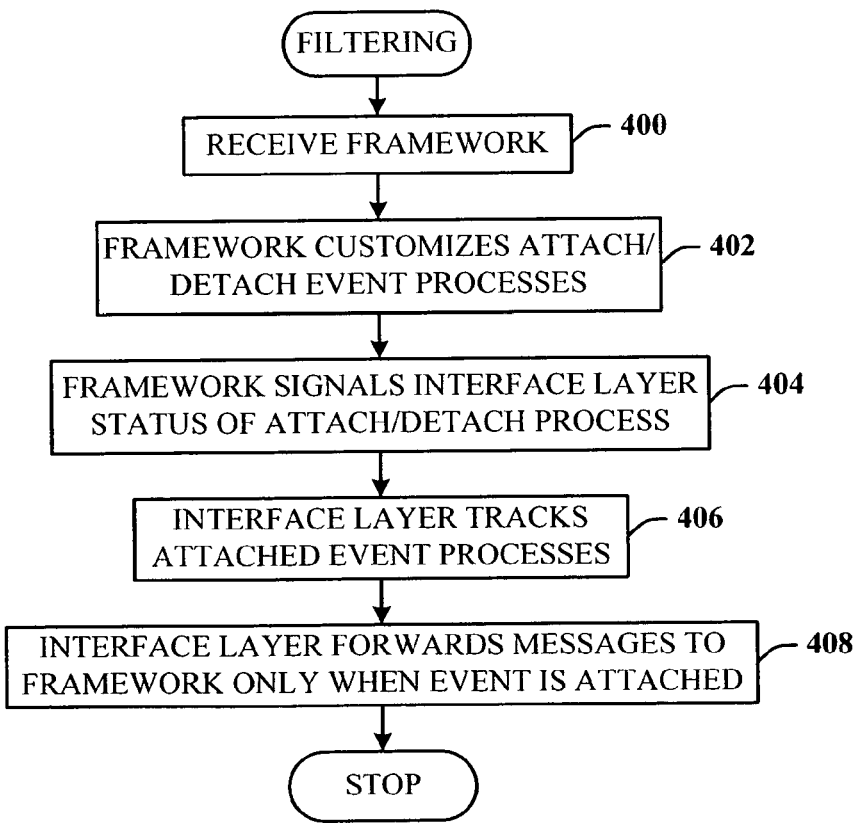
FIG. 4 illustrates a flow chart of a process for filtering events in accordance with the present invention.

Referring now to FIG. 4, there is illustrated a flow chart of a process for filtering events in accordance with the present invention. Users of the framework can implicitly indicate interest in particular messages by instantiating a framework object and attaching an event handler to one of its events and two, and deriving a custom object from a framework object and modifying the way the framework object responds to messages. A language runtime provides syntax for attaching and detaching event handlers from events on a framework object. Following is one method by which framework users indicate interest in a message. At 400, the framework is provided. At 402, the framework customizes attach and detach processes. At 404, the framework signals the native interface layer of the status of the attach/detach process, i.e., that an event handler has been attached or detached. At 406, the native layer tracks the number of attached event handlers. At 408, the interface layer only forwards the relevant messages to the managed framework when one of more event handlers is attached. The process then reaches a Stop block.

Framework User Source Code

Following is sample framework user source code representative of a mouse click event.

```
public class MyForm : Form
{
    protected Button myButton;
    public MyForm( )
    {
        myButton = new Button( );
        // User implicitly indicates "interest" here
        myButton.Click += new
            EventHandler(this.myButton_Click);
    }
    protected virtual void myButton_Click(object sender, EventArgs e)
    {
        // User acts on event resulting from message
        // forwarded to managed code from the native layer.
    }
}
```

Framework Implementation Source Code

Following is sample customized source code generated by the framework from the user source code of the above example.

```
public class Button : Control
{
    private event EventHandler m_evtClick;
    // Process messages forwarded from native layer
    protected void MessageHandler (Message m)
    {
        switch (m)
        {
            case MSG_CLICK:
                OnClick(EventArgs.Empty);
                break;
        }
    }
    // Process event handler attach and detach
    public event EventHandler Click
    {
        add
        {
            m_evtClick += value;
            // Framework notifies native layer of
            // attached event handler
        }
        remove
        {
            // Framework notifies native layer of
            // event handler detach
            m_evtClick -= value;
        }
    }
    // Notify attached event handlers of message
    protected virtual void OnClick(EventArgs e)
    {
        if (m_evtClick != null)
            m_evtClick(this, e);
    }
}
```

Figure 5:
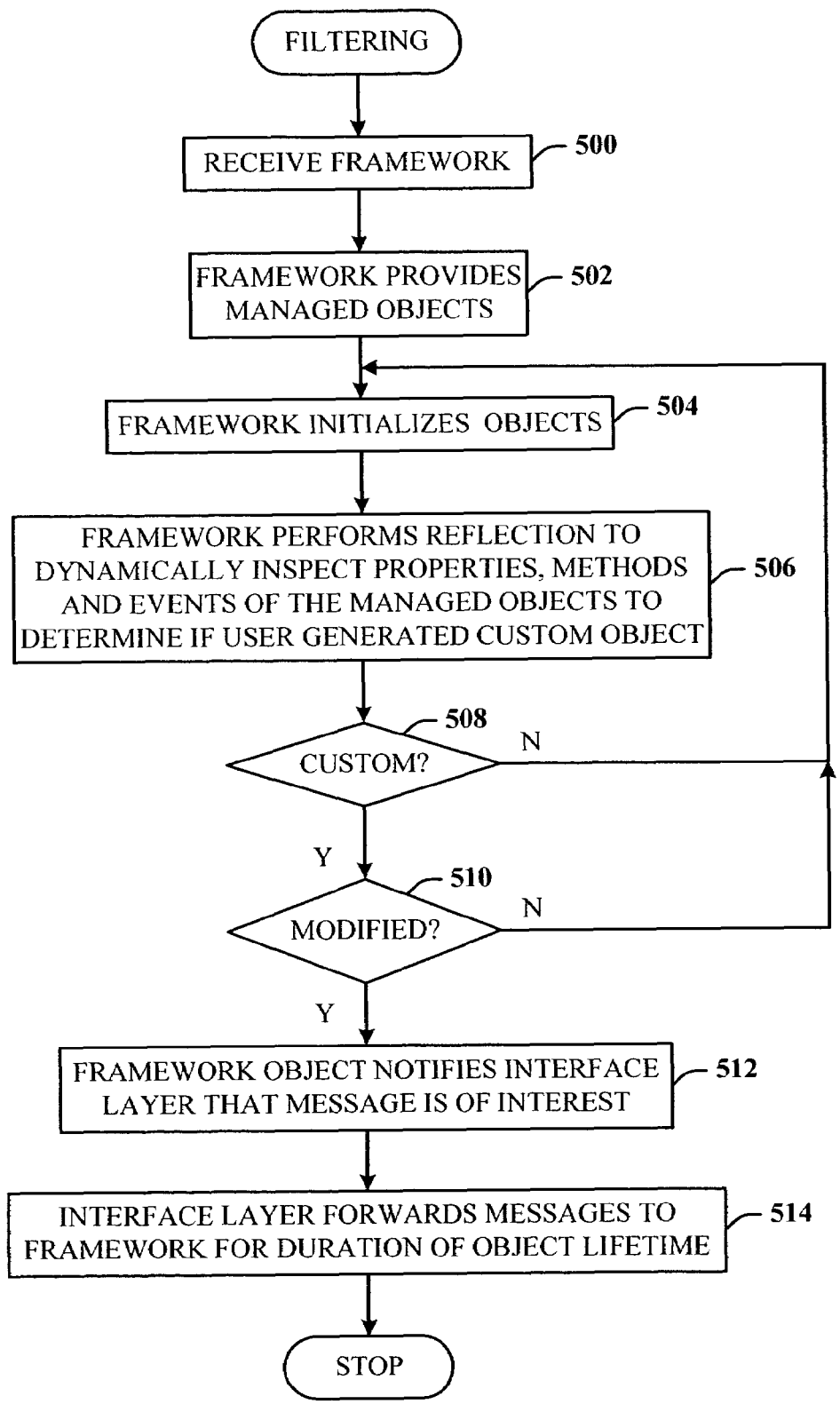
FIG. 5 illustrates a flow chart of an alternative process for filtering events in accordance with the present invention.

Referring now to FIG. 5, there is illustrated a flow chart of an alternative process for filtering events in accordance with the present invention. The language runtime also includes the capability of type introspection (and in one specific implementation, called reflection), to dynamically inspect the properties, methods and events implemented on a managed object. At 500, the framework is provided. At 502, the framework provides managed objects. At 504, the framework initializes its objects. At 506, the framework performs reflection. At 508, a determination is made if the framework user has derived their own custom object. If so, flow is to 510 to determine if the user has modified the handling of messages in the custom object. If it is determined that message handling has been modified, flow is to 512 where the framework object will notify the native interface layer that the message is of interest to the user. At 514, the native layer forwards messages to the managed framework for the duration of the lifetime of the managed object. The process then reaches a Stop block.

Note that the present invention is not restricted to a common language runtime, but can be any type introspecting runtime, e.g., JAVA and SMALLTALK. Moreover, the framework can be managed code receiving a message across the interface from managed code, native code receiving a message across the interface from managed code, and native code receiving a message across the interface from native code.

An advantage of the alternative implementation is that the framework user does not need to use additional function calls or unusual API's (Application Program Interfaces) to indicate "interest" in particular messages. The framework is able to infer "interest" directly from the user's implementation of their application or library.

Framework User Source Code

Following is sample framework user source code representative of the above reflection process.

```
public class MyButton : Button
{
    // User implicitly indicates "interest" here
    protected virtual override void OnClick(EventArgs e)
    {
        // User acts on message forwarded from native
        // layer.
    }
}
```

Framework Implementation Source Code

Following is sample customized source code generated by the framework from the user source code of the above example.

```
public class Button : Control
{
    public Button( )
    {
        // Use CLR reflection to determine if user has
        // customized message handling on this class.
        // If so, notify the native layer to forward
        // necessary messages.
    }
}
```

It is to be appreciated that the present invention could be implemented with other languages or run-times that have equivalent functionality to reflection of the CLR. Additionally, this invention can be implemented with languages that use callbacks for event handlers. The functionality of the native layer to selectively forward messages to the managed framework can be integrated into the operating system directly. The subject invention could also be applied to any message-based architecture where the client is frequently only interested in a subset of the total number of available messages.

Figure 6:
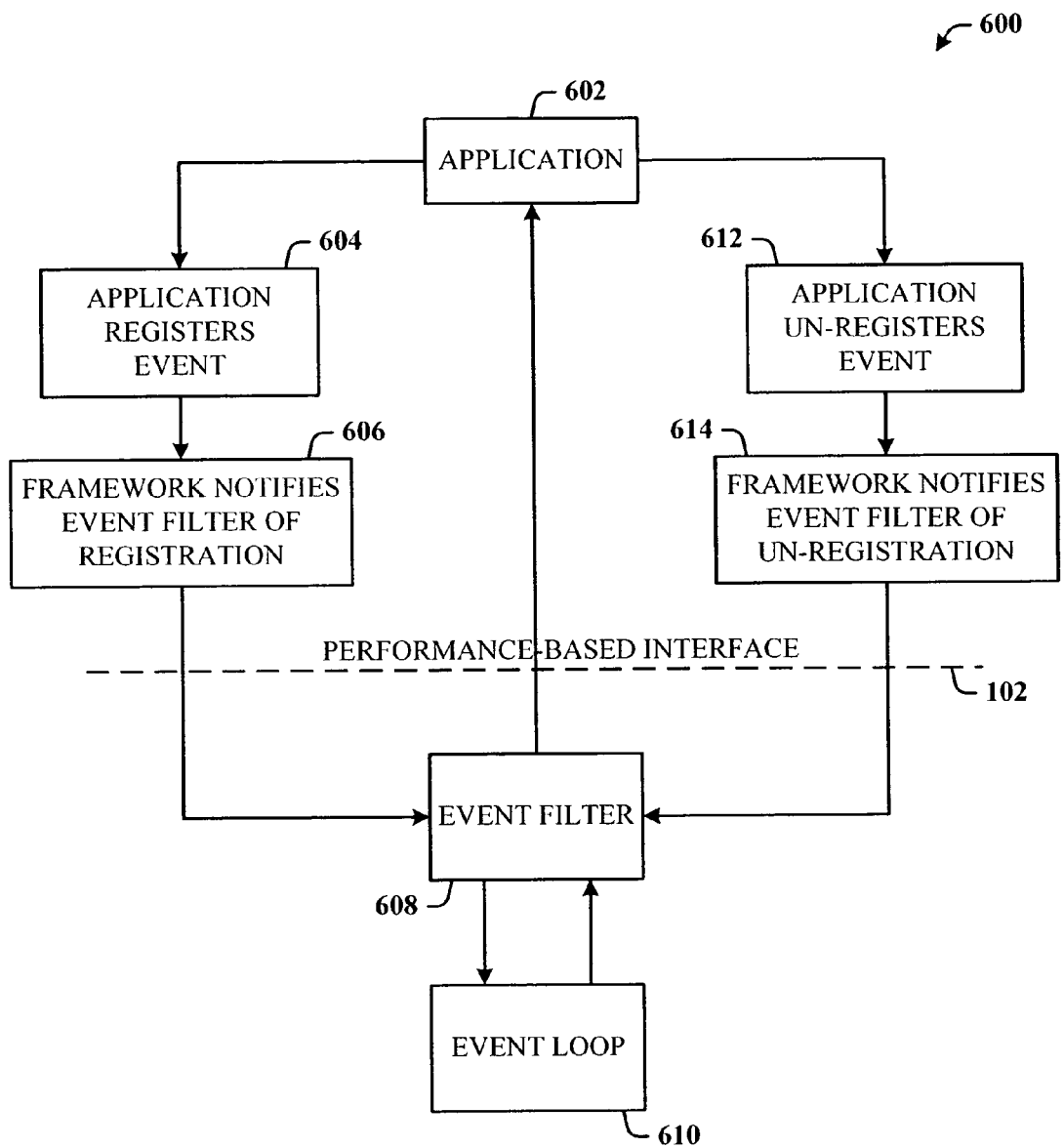
FIG. 6 illustrates a block diagram of a dynamic event handling process in accordance with the present invention.

Referring now to FIG. 6, there is illustrated a block diagram of a dynamic event handling process 600 in accordance with the present invention. There is provided an application 602 that sends out a request (or message) to the native code, expecting to receive back a response. The request can be related to any type of event that is user generated and/or application generated. The application 602 registers the event at 604. At 606, the managed code framework receives the event and notifies an event filter 608 of the registration. The event filter is located across the performance-based interface 102 positioned to intercept and reject responses to the events that are not needed by the application 602. The event filter 608 than communicates back to the application 602 across the interface 102 that it has received notification of the registered event. The event is then processed through an event loop 610 that includes processing the request associated with the event in accordance with the destination processes (e.g., a native code layer or system operating system), and receiving back a plurality of information associated with responses to the request. The responses are fed back to the event filter 608, and then filtered for irrelevant responses such that only relevant responses are forwarded from the filter 608 across the interface 102 to the application 602.

Once the one or more responses are received and processed by the application 602, the event can be unregistered, at 612. The framework receives the unregistered message, at 614, and notifies the event filter 608 that the event is now unregistered. The filter will then prevent all responses associated with this event from crossing the interface 102. At this time, the filter 608 can also signal the application that the event has been un-registered; however, this is not necessary.

Figure 7:
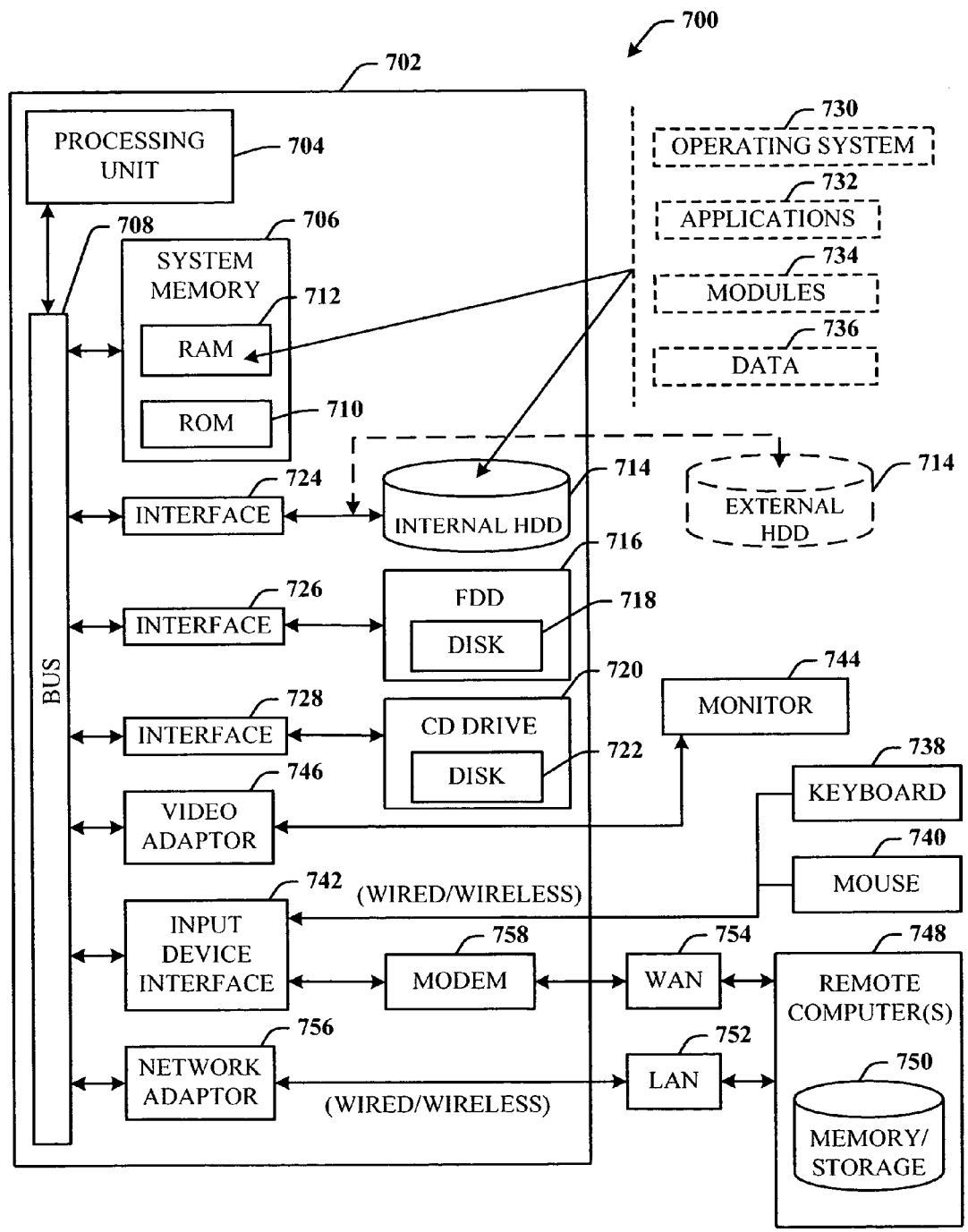
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, there is illustrated an exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 may be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 712, including an operating system 730, one or more application programs 732, other program modules 734 and program data 736. All or portions of the operating system, applications, modules, and/or data can also be cached in the RAM 712.

It is appreciated that the present invention can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but may be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections via wired and/or wireless communications to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 can include a modem 758, or is connected to a communications server on the LAN, or has other means for establishing communications over the WAN 754, such as by way of the Internet. The modem 758, which may be internal or external and a wired or wireless device, is connected to the system bus 708 via the serial port interface 742. In a networked environment, program modules depicted relative to the computer 702, or portions thereof, may be stored in the remote memory/storage device 750. It will be appreciated that the network connections shown are exemplary and other means of establishing a communications link between the computers may be used.

The computer 702 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 8:
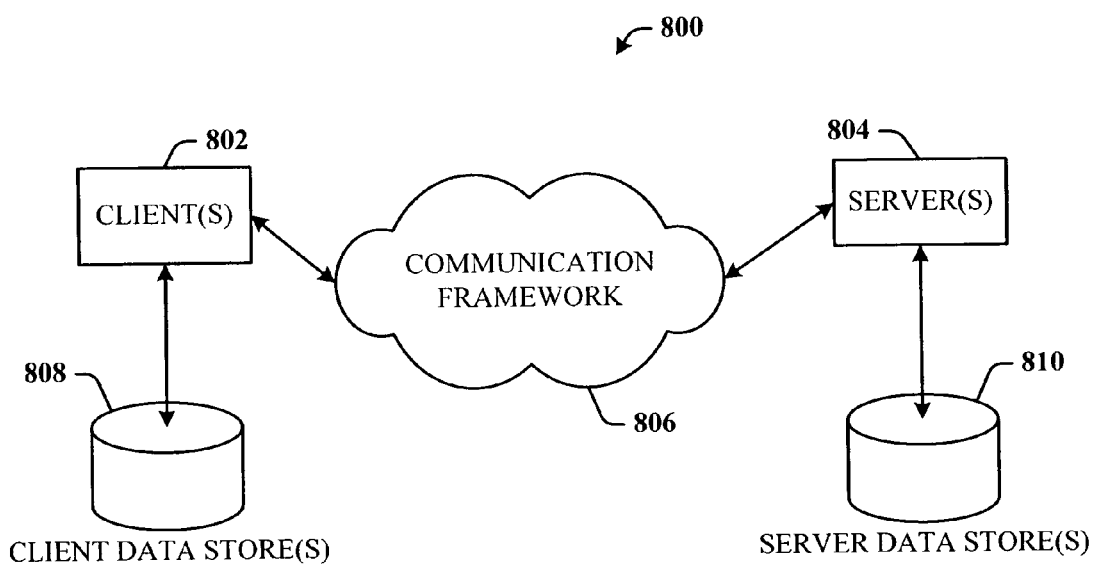
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 may be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications may be facilitated via a wired (including optical fiber) and/or wireless technology. The client(s) 802 are operably connected to one or more client data store(s) 808 that can be employed to store information local to the client(s) 802 (e.g., cookie(s) and/or associated contextual information). Similarly, the server(s) 804 are operably connected to one or more server data store(s) 810 that can be employed to store information local to the servers 804.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates a performance enhancement in message-based computing, the system comprising at least one processor and one or more computing devices configured with:
   a performance-based event transmission interface across which a request from a source is transmitted to a destination; and
   a filter component in communication with the destination that dynamically determines which response information is relevant in order to filter out any excess response information that is deemed irrelevant, such that allows only relevant responses from the destination are transmitted to the source via the performance-based event transmission interface, wherein the filter component is part of at least one of native code and managed code and wherein irrelevant responses are discarded;
   wherein the source notifies a native layer that an event handler has attached or detached,
   wherein the destination issues a callback to the source, in response the filter component permits only a relevant response to the callback to be transmitted to the destination, and
   wherein the filter component is notified by the source when an event handler has attached to or detached from a source object, and forwards the one or more responses only when the associated event handlers are attached.

2. The system of claim 1, the source comprises at least one of native code and managed code, and the destination comprises at least one of native code and managed code.

3. The system of claim 1, the filter component is integrated into an operating system.

4. The system of claim 1 is employed in a small footprint execution environment that has reduced resources.

5. The system of claim 1, the source is part of a managed code framework that includes a graphical user interface (GUI) application that transmits an event for processing by the destination, which destination is part of native code.

6. The system of claim 1, further comprising a classifier that makes an inference about processes that can be automatically performed.

7. A computer readable storage medium having stored thereon computer executable instructions for carrying out the system of claim 1.

8. A computer that employs the system of claim 1.

9. A server that employs the system of claim 1.

10. The system of claim 1, the source is associated with a GUI such that the request receives only the one or more responses from a graphics/windowing/events system that are relevant to the request.

11. The system of claim 1, the source can dynamically inspect at least one of properties, methods, and events implemented on a source object.

12. The system of claim 1, the source utilizes reflection during initialization of an object to determine the presence of a custom object.

13. The system of claim 1, the source utilizes reflection during initialization of an object to determine if message handling has been modified in a custom object.

14. The system of claim 1, the source utilizes type introspection to determine the presence of a custom object, in response to which the destination is notified that a message associated with the custom object is of interest and will be forwarded from the destination for a lifetime of the custom object.

15. A system that facilitates a performance enhancement in message-based computing, the system comprising at least one processor and one or more computing devices configured with:
   a managed code framework that generates a request;
   a native code framework that receives the request and issues one or more responses thereto;
   a performance-based event transmission interface between the managed code framework and the native code framework across which the request is passed and the one or more responses are transmitted; and
   a filter component in communication with the native code framework that dynamically determines which response information is relevant in order to filter out any excess response information that is deemed irrelevant, such that allows only relevant responses of the native code framework are transmitted to the managed code framework via the performance-based event transmission interface, wherein irrelevant responses are discarded; and
   a managed code filter component that is part of the managed code framework, which managed code filter processes a callback from the native code framework and only forwards responses from the managed code to the native code that are relevant to the callback,
   wherein the filter component is notified by the managed code framework when an event handler has at least one of registered and unregistered from a managed object and forwards the one or more responses only when the associated event handlers are registered.

16. The system of claim 15, the filter component is part of the native code framework.

17. The system of claim 15, the filter component only allows the one or more responses across the performance-based event transmission interface that are relevant to the request.

18. The system of claim 15, the filter component only processes events that are registered.

19. The system of claim 15, the managed code framework source utilizes type introspection during initialization of an object to determine the presence of a custom object.

20. The system of claim 15, the managed code framework utilizes type introspection during initialization of an object to determine if message handling has been modified in a custom object.

21. The system of claim 15, the managed code framework utilizes type introspection to determine the presence of a custom object, in response to which the native code framework is notified that a message associated with the custom object is of interest and will be forwarded from the native code framework for a lifetime of the custom object.

22. A computer-readable storage medium tangibly embodying thereon computer-executable instructions for performing a method of managing messages across a performance-based event transmission interface, the method comprising:
   receiving the performance-based event transmission interface across which a request from a source is transmitted to a destination;
   returning one or more responses to the request from the destination;
   dynamically determining which response information is relevant in order to filter out any excess response information that is deemed irrelevant;
   filtering the one or more responses to allow only responses that are relevant to the request to be transmitted from the destination to the source via the event transmission performance-based interface, wherein irrelevant responses are discarded; and transmitting the relevant responses across the performance-based event transmission interface to the source;

wherein the source notifies a native layer that an event handler has attached or detached, wherein the destination issues a callback to the source, in response the filter component permits only a relevant response to the callback to be transmitted to the destination, wherein the filter component is notified by the source when an event handler has attached to or detached from a source object, and forwards the one or more responses only when the associated event handlers are attached.

23. The computer-readable storage medium of claim 22, the act of filtering occurs on the destination side of the performance-based event transmission interface.

24. The computer-readable storage medium of claim 22, the method further comprising at least one of the acts of:

transmitting the relevant responses according to priority criteria;

transmitting a request from the destination to the source;

filtering the one or more responses to allow only responses from the source that are relevant to the request; and transmitting the relevant responses across the performance-based event transmission interface to the destination.

25. A method of managing messages across a performance-based event transmission interface, comprising using one or more processors to perform the following computer-executable acts:

receiving the performance-based event transmission interface between a managed code and a native code;

registering an event handler for an event of a managed object;

notifying the native code that the event handler is registered;

returning one or more responses of the native code associated with the event;

dynamically determining which response information is relevant in order to filter out any excess response information that is deemed irrelevant;

filtering the one or more responses of the native code to determine the relevant responses associated with the event, such that only responses that are relevant to the request are allowed to be transmitted from the destination to the source via the performance-based event transmission interface, wherein irrelevant responses are discarded;

transmitting the relevant responses across the performance-based event transmission interface to the managed code only when the associated event handler is registered;

processing a request, issued by an application, associated with the event in accordance with a destination process;

unregistering the event;

notifying an event filter that the event is unregistered; and signaling the application that the event has been unregistered.

26. The method of claim 25, further comprising tracking the attached event with the native code.

27. A system that facilitates the management of messages across a performance-based event transmission interface, comprising:

a processor;

system memory;

means for receiving the performance-based event transmission interface between a managed code and a native code;

means for registering an event handler for an event of a managed object;

means for notifying the native code that the event handler is registered;

means for returning one or more responses of the native code associated with the event;

means for dynamically determining which response information is relevant in order to filter out any excess response information that is deemed irrelevant;

means for filtering the one or more responses of the native code to determine the relevant responses associated with the event, such that only responses that are relevant to the request are allowed to be transmitted from the destination to the source via the event transmission performance-based interface, wherein irrelevant responses are discarded;

means for transmitting the relevant responses across the performance-based event transmission interface to the managed code only when the associated event handler is registered; and means for unregistering the one or more event handlers when the associated events have expired.

* * * * *